United States Patent [19]
Opheij

[11] Patent Number: 5,146,080
[45] Date of Patent: Sep. 8, 1992

[54] PLANAR OPTICAL SCANNING HEAD WITH CONCENTRIC DIFFRACTION GRATINGS

[75] Inventor: Willem G. Opheij, Eindhoven, Netherlands

[73] Assignee: U.S. Philips Corporation, New York, N.Y.

[21] Appl. No.: 728,439

[22] Filed: Jul. 11, 1991

[30] Foreign Application Priority Data
Apr. 23, 1991 [EP] European Pat. Off. ............ 91200971

[51] Int. Cl.$^5$ ............................................ E04G 17/06
[52] U.S. Cl. ...................................... 250/216; 385/37; 369/44.12
[58] Field of Search ................ 250/201.5, 216; 385/10, 385/37, 130, 131, 132; 369/44.12, 44.23, 44.14, 109; 359/571, 573, 574, 575

[56] References Cited
U.S. PATENT DOCUMENTS
4,991,919  2/1991  Nishiwaki et al. .................... 385/37
5,070,488 12/1991  Fukushima et al. .................. 385/37

Primary Examiner—David C. Nelms
Assistant Examiner—K. Shami
Attorney, Agent, or Firm—David R. Treacy

[57] ABSTRACT

A planar optical head is described, which comprises a detector grating (15) for scanning a surface, for example, a recording layer (2) in an optical record carrier (1). A radiation source (5) supplies a beam (6) which is coupled into a waveguide (9) by an input grating (7) and is formed to a focused scanning beam (11) by an output grating (10). A scanning focus (13) having an optimum shape and a high intensity is obtained by arranging, in the path of the beam reflected by the record carrier, a special detector grating (15) which deflects this beam towards a detection system (17).

20 Claims, 9 Drawing Sheets

PLANAR OPTICAL SCANNING HEAD WITH CONCENTRIC DIFFRACTION GRATINGS

CROSS-REFERENCE TO RELATED APPLICATION

This application is related to my concurrently filed application, Ser. No. 07/728,440, for a Planar Optical Scanning Head.

BACKGROUND OF THE INVENTION

The invention relates to an optical head for scanning a surface, which head is provided with a radiation source, an element comprising a substrate on which an input grating is arranged for coupling the radiation from the source into a waveguide of the element, an output grating arranged on the substrate around the input grating for coupling radiation out of the waveguide and for directing said radiation in the form of a scanning beam onto the surface, and a detection system. An optical head of this type may be used in apparatuses for inspecting surfaces in which, for example, contours in a surface are scanned. An example of such an apparatus is a scanning microscope. The head can also be used in a device for scanning recording layers in an optical record carrier. The head can be used for writing and reading the recording layer.

An optical head of the type described in the opening paragraph is known from European Patent Application no. 0,357,780. In this optical head the radiation reflected by the record carrier is sent back into the waveguide via the output grating. The radiation is subsequently passed through an annular output element to an annular detection system where electrical signals are generated for controlling the focusing and the radial position of the scanning beam, as well as a signal which represents the data read in the record carrier. The output grating of the known head has four segments by means of which two extra focus points are made which are offset along the optical axis with respect to the actual focus of the scanning beam. These extra focus points are used to generate a focus error signal. A drawback of this known optical head is that a part of the radiation does not reach the scanning focus and that the pupil of the scanning beam is not uniformly filled with radiation because the radiation from said four segments of the output grating does not contribute to the scanning beam. This results in a reduction of the intensity of the scanning focus, which has a detrimental influence on the performance of the apparatus having such a head. Moreover, the shape of the scanning focus deviates from the ideal shape, i.e. the Airy shape. The higher energy concentrations far away from the optical axis lead to a decreased quality of the data signal and a larger crosstalk between adjacent tracks.

It is an object of the invention to provide an optical head having a scanning focus with an optimum shape and a maximum intensity.

To this end the optical head according to the invention is characterized in that it is provided with a detector grating arranged around the input grating for deflecting the radiation reflected by the record carrier towards the detection system. By making use of a different method for generating focus errors, all radiation coming from the output grating can be used for the scanning focus, which contributes to the shape as well as to the intensity of the scanning focus. Moreover, the radiation need not be coupled into the waveguide again after reflection on the surface to be scanned, so that radiation losses due to the relatively low coupling efficiency of the current output gratings can be prevented.

It is to be noted that Japanese Patent Appliction 62-103857 describes an optical head which also comprises a substrate with two gratings. This optical head does not have a waveguide so that the distance between the radiation source and the substrate must be considerably larger than in the head according to the present invention in order that the beam from the source fills the gratings completely. Moreover, the shape and function of the gratings in the known head differ from those in the optical head according to the invention.

It is possible to mount the output grating and the detector grating on the same surface of the substrate. However, from a technological point of view an embodiment of the invention is preferred in which the output grating is arranged at that side of the substrate which is remote from the radiation source and which is characterized in that the detector grating is arranged at that side of the substrate which faces the radiation source. It is simpler to mount the gratings at different sides of the substrate.

A further embodiment is characterized in that the radiation source is secured to the substrate. This reduces the number of components in the optical head because it does not require a separate holder for the radiation source which should also be aligned on the holder of the substrate during assembly.

In accordance with a further characteristic feature the detection system is secured to the substrate. This has advantages which are analogous to those obtained when securing the radiation source to the substrate. According to the invention the radiation source and the detection system can be mounted at the one side of the substrate, while the output grating and the detector grating can be mounted at the other side.

A preferred embodiment of the optical head is characterized in that the substrate comprises two interconnected parts, in that the detector grating is located between the two substrate parts and in that the output grating is located at the side, remote from the radiation source, of that substrate part which is furthest remote from the radiation source. Since the two gratings are not arranged on one and the same carrier surface, the optical head can be manufactured in a simpler manner.

In accordance with a further aspect of the invention the detector grating may be designed in such a way that it gives the reflected deflected beam a shape which is suitable for generating a focus error signal, i.e. a signal being a measure of the distance between the scanning focus and the surface to be scanned.

A first embodiment of the optical scanning head with an adapted detector grating is characterized in that the detector grating introduces astigmatism into a deflected beam and in that the detection system comprises a four-quadrant detector for generating a focus error signal.

A second embodiment of such a scanning head is characterized in that the detector grating comprises two grating parts for forming two deflected beams which are focused at the same distance from the detector grating, one of the grating parameters, grating period and orientation of the grating lines, being different for the two grating parts, and in that the detection system for each one of said beams comprises two detectors for generating a focus error signal.

A third embodiment of such a scanning head is characterized in that the detector grating comprises two interlaced patterns of grating lines for forming two deflected beams which are focused at mutually different distances from the detector grating, and for each of said beams is provided with a detection system for determining the diameter of the beam at the location of the detection system.

The output grating may be designed in such a way that it does not only couple radiation out of the waveguide but also focuses the scanning beam on the surface to be scanned. In that case the detector grating should be designed in such a way that it does not only deflect the reflected beam to the detection system but also converts this diverging beam into a converging beam. The requirements to be imposed on the grating may become less stringent if, in accordance with a further characteristic feature, a lens is arranged in the optical path of the scanning beam. The two gratings now only have to change the direction of the radiation through a small angle because the beam is focused by the lens.

A special embodiment of the optical head is characterized in that the detector grating, the output grating and the input grating are each divided into n groups of m identical sectors which are associated with each other and are located symmetrically with respect to each other, in which the corresponding groups of sectors of the three gratings form part of a radiation path for a beam having a given wavelength of the radiation source, and in which n and m are integers which are larger than one. Due to the presence of optical paths which have been optimized for different wavelengths, the optical head can operate at different wavelengths. A variation of the wavelength of the radiation source can then be compensated for.

It is to be noted that German Patent Specification no. 2,516,236 describes an optical component which is divided into circular segments, each segment comprising a hologram. The function and the design of the holograms differ from those of the gratings in the sectors according to the invention. The known holograms form different sub-beams from a single, monochromatic coherent beam. In contrast, the gratings according to the invention form different beams from a non-monochromatic beam by selecting a single wavelength from it.

Embodiments of the invention will now be described in greater detail with reference to the accompanying drawings in which.

Figure 1:
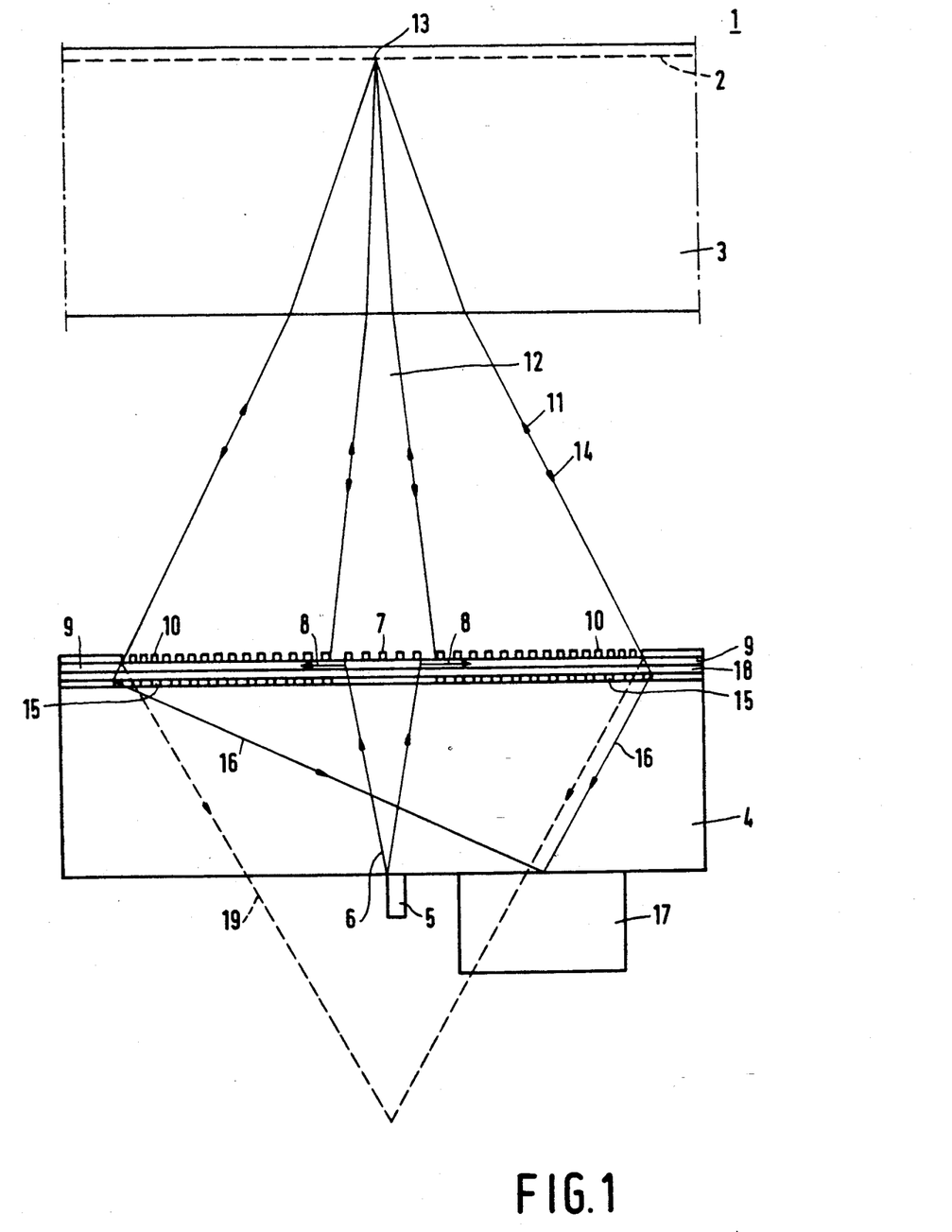
FIG. 1 shows an embodiment of the optical head.

FIG. 1 shows an embodiment of an optical head and a record carrier in a cross-section. The record carrier 1 has a reflecting recording surface 2 and a transparent carrier 3. The optical head comprises a substrate 4 on which all components have been secured. A radiation source 5 is mounted on the lower side of the substrate. The radiation source is preferably a laser diode. A radiation beam 6 from the source passes through the substrate 4 towards an input grating 7. This grating converts the upgoing radiation beam 6 into a horizontal beam 8 which propagates in a flat, annular waveguide 9. The waveguide is a thin layer of material having a refractive index which differs from that of the layers enclosing the waveguide in such a way that a radiation beam is trapped in the waveguide. The radiation in the waveguide spreads radially towards the edge of the substrate 4. An output grating 10 coupling radiation out of the waveguide and converting it into a converging scanning beam 11 is directly arranged on the waveguide 9. The scanning beam 11 is focused to a scanning spot 13 on the recording surface 2. The centre 12 of the scanning beam does not comprise any radiation due to the presence of the input grating 7. This does not have any great influence on the quality of the scanning spot because the surface of the centre 12 is small as compared with the cross-section of the scanning beam 11 and because the area 12 is located in the centre of the scanning beam. After reflection on the recording surface the scanning beam returns to the substrate 4.

A part of the radiation in the reflected beam 14 will be coupled back into the waveguide 9 due to the coupling efficiency which is smaller than one. A part of the reflected radiation will therefore enter the substrate through the output grating 10. According to the invention a detector grating 15 deflecting the reflected radiation into a detector beam 16 incident on a detection system 17 is arranged underneath the output grating. Like the radiation source 5, the detection system is mounted on the lower side of the substrate 4. The detection system converts the incident beam into electrical signals for focusing and radial tracking of the scanning beam and for detecting the information in the recording surface 2.

The detector grating 15 is designed to deflect a maximal quantity of incident radiation towards the detection system 17. The grating will therefore be preferably blazed, i.e. it will have such a geometry that the quantity of radiation in the desired direction is maximum. By blazing it is possible to use higher orders of the grating. The period of the grating structure may then increase, which makes it easier to manufacture the grating. In FIG. 1 the period of the grating structure is larger at the right than at the left because an angle variation of the radiation direction at the right-hand side is required to be smaller than at the left-hand side. The detector grating 15 is interrupted at the location of the radiation beam 6. A possible structure at this location would only attenuate the radiation beam 6, while at that location there is no reflected beam to be deflected towards the detection system. An intermediate layer 18 having a thickness of at least several wavelengths of the radiation from the radiation source 5 is preferably arranged between the detector grating 15 and the waveguide 9. This prevents the coupling between the detector grating and the waveguide from becoming too large and a considerable part of the ongoing radiation in the waveguide from being directly coupled out to the lower side and from getting lost.

The greater part of the radiation coupled out of the waveguide 9 by the output grating 10 will go upwards in the scanning beam 11. However, it cannot be avoided that a portion of the radiation which has been coupled out will form a converging beam 19 which enters the substrate 4. The detector grating 15 will also deflect a part of this beam. Since the reflected beam 14 and the converging beam 19 have a different vergence in the plane of the detector grating, the deflected beams will not coincide. As a result, the beam 19 and the beams deflected therefrom will produce little interference for most designs of the detector grating 15.

In the embodiment of FIG. 1 the output grating 10 and the detector grating 15 are mounted on each other, which may cause problems during manufacture. These problems are prevented in the embodiment of FIG. 2 in which the gratings are located at different sides of the substrate. In this embodiment it is no longer possible to mount the detection system 17 on the substrate 4. It depends on the thickness of the substrate and on the path of the detector beam 16 whether the radiation source 5 can be mounted on the substrate.

Figure 3:
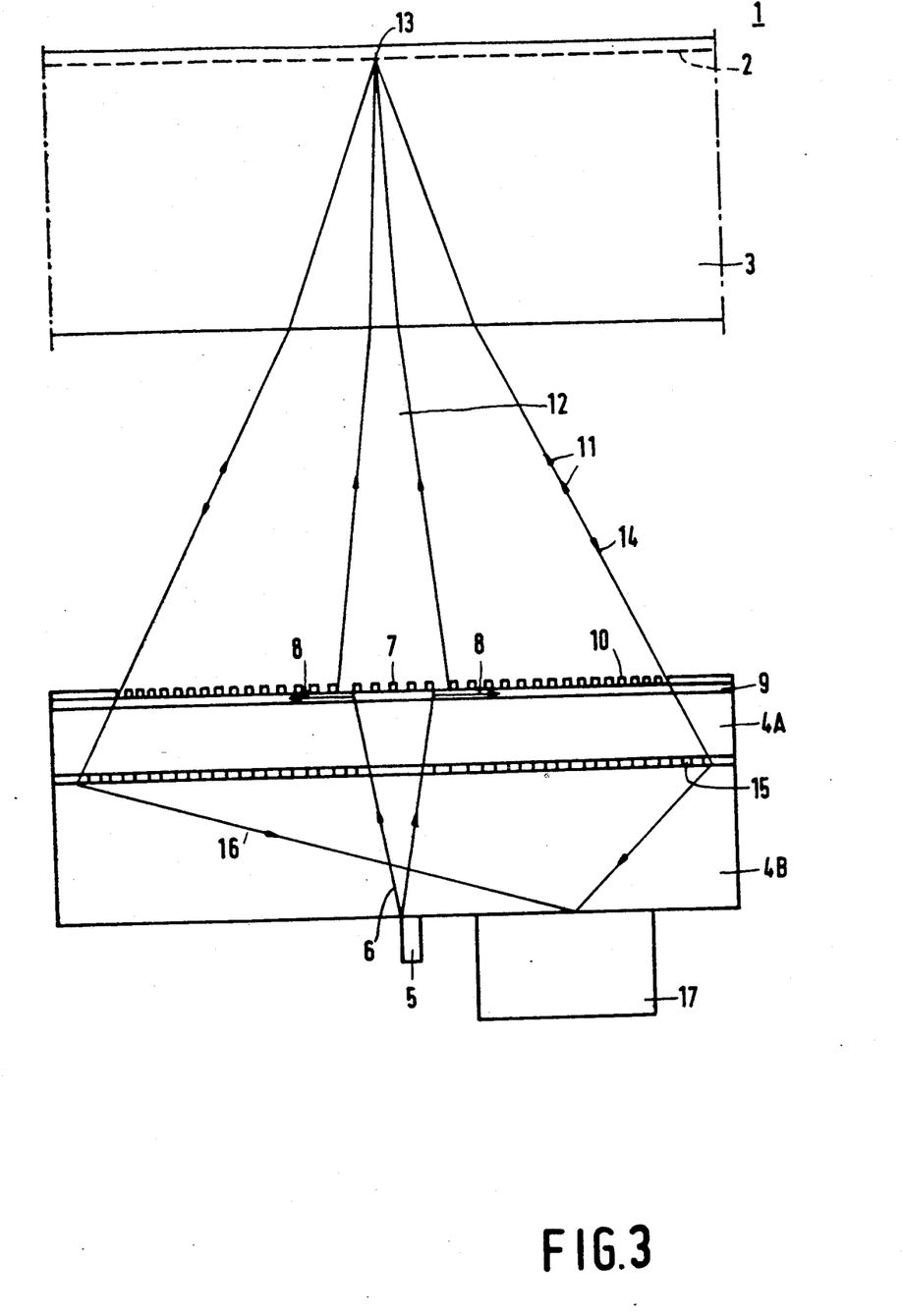
FIG. 3 shows an embodiment of a split substrate.

FIG. 3 shows an optical head in which the substrate is split into two parts 4a, 4b. The output grating 10 is located on top of the upper part 4a, while the detector grating 15 is located on top of the lower part 4b or at the lower side of the upper part 4a. After combining the substrate parts, the detector grating is enclosed between the parts. In addition to the simplicity of manufacture, because each grating is arranged on a separate surface, this embodiment has the advantage that both the radiation source 5 and the detection system 17 can be mounted on the substrate if the thickness of the lower part 4b is suitably chosen.

Figure 2:
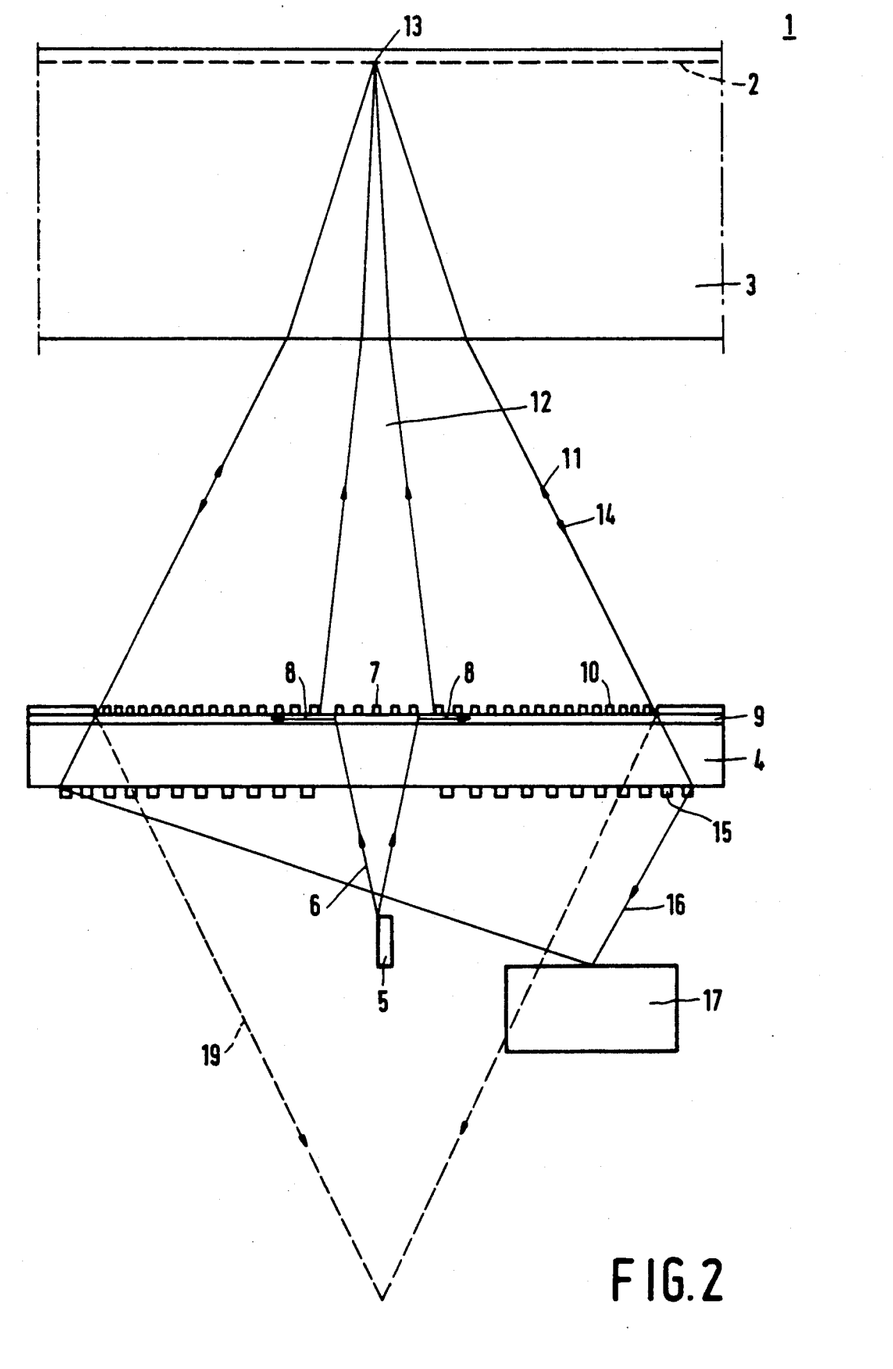
FIG. 2 shows an embodiment in which the output grating and the detector grating are mounted at different sides of the substrate.

The three embodiments of FIGS. 1, 2 and 3 may make use of known detection systems for converting a scanning beam reflected by a record carrier into a signal which represents the information which has been read, a tracking error signal and a focus error signal, which detection systems have proved their efficiency in practice. The detection systems with which a focus error signal is generated in accordance with the so-called astigmatic method, the Foucault method or the method based on variation of the size of the cross-section of a beam at the location of the detection system, the so-called beam size method, are very suitable.

Figure 4:
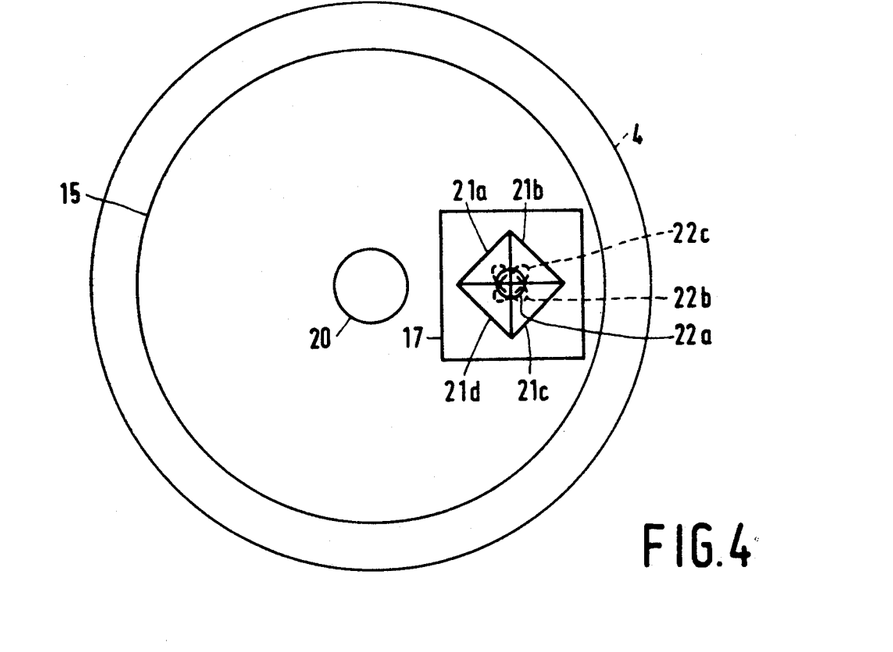
FIG. 4 is a plan view of the detector grating and the detection system for generating the astigmatic focus error.

The astigmatic focus detection method is known per se from U.S. Pat. No. 4,023,033. FIG. 4 is a plan view of the optical head in which the detector grating 15 as well as the detection system 17 located below it is adapted to generate a focus error signal in accordance with the astigmatic method. The detector grating 15 has such a grating structure that astigmatism is introduced into the beam 16 deflected towards the detection system. The aperture 20 in the detector grating is necessary to pass the radiation beam 6 from the source. The detection system 17 is provided with a four-quadrant detector comprising four detection elements 21a, 21b, 21c, 21d. When the focus 13 of the scanning beam 11 is located exactly on the recording surface 2, a round spot 22a is formed on the four-quadrant detector. When the focus is above or below the recording surface, the round spot changes to an ellipse whose major axis extends at an angle of −45° (22b) or an angle of +45° to one of the bounding lines of the detection elements. A focus error signal can be generated by adding and subtracting the signals of the detection elements in the correct combinations. The orientation of the bounding lines of the detection elements and the direction of the astigmatism in the detector beam 16 are chosen to be such that to first order the focus error signal is not influenced by diffraction effects caused by tracks in the recording surface 2. In FIG. 4 it has been assumed that the tracks run parallel to the line through the centre of the substrate and the centre of the four-quadrant detector.

Figure 5A:
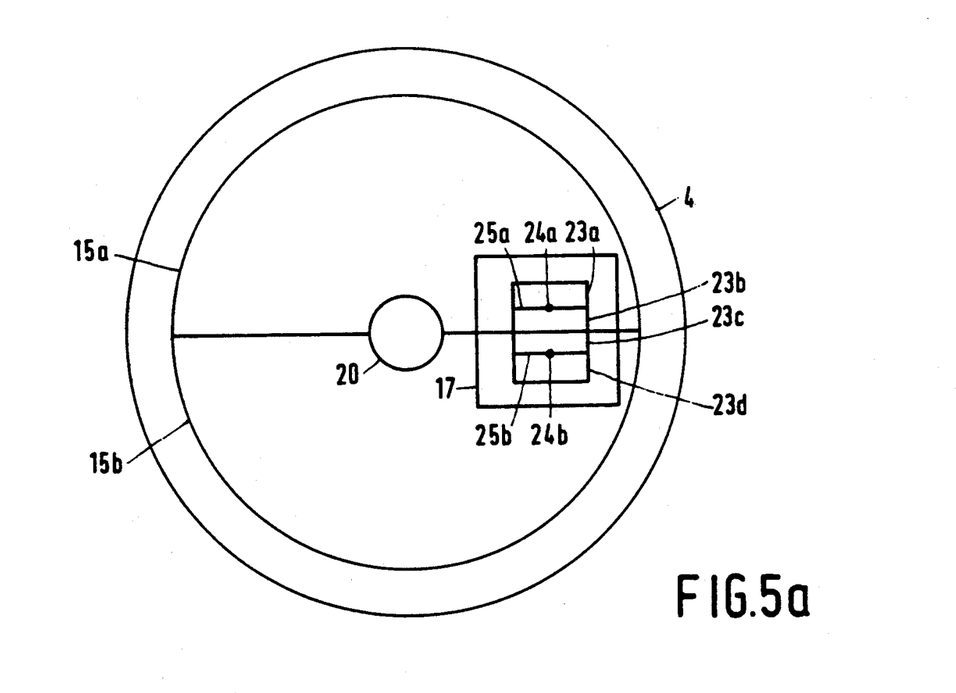
FIG. 5a is a plan view of the detector grating and the detection system for generating the Foucault focus error.
Figure 5B:
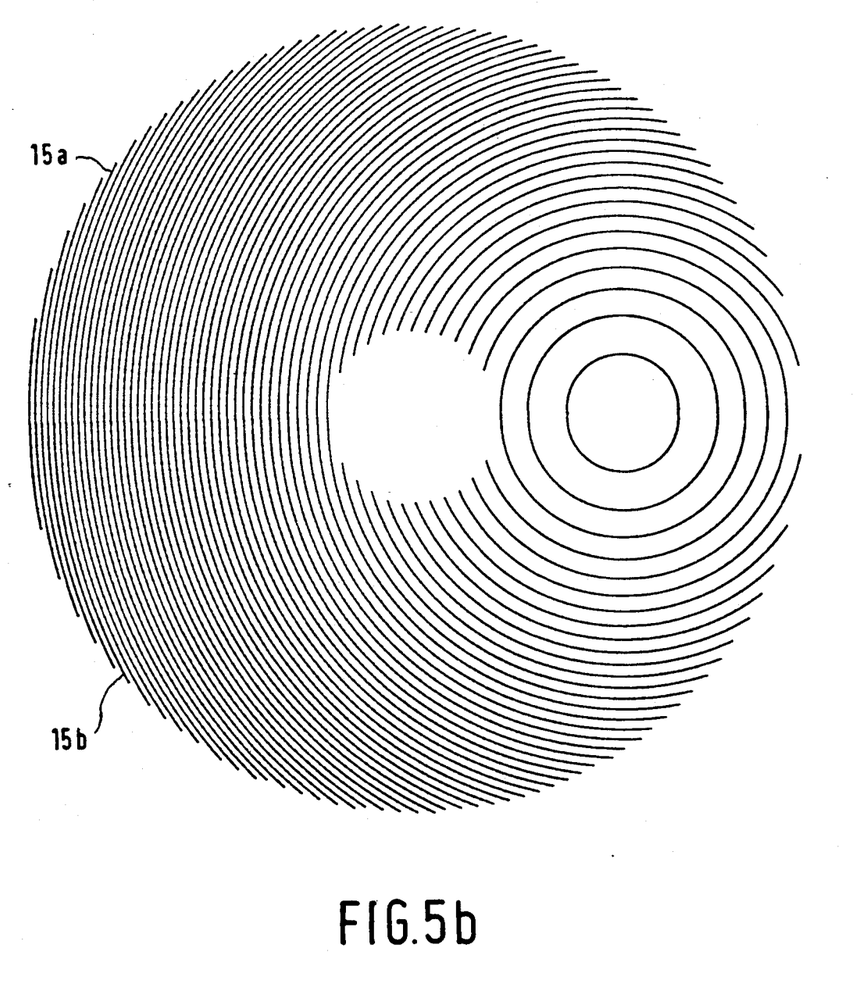
FIG. 5b shows a detector grating for generating the Foucault focus error.

The Foucault method is known per se from U.S. Pat. No. 4,665,310. FIG. 5a is a plan view of the optical head in which both the detector grating and the detection system located below it are adapted to generate a focus error signal in accordance with the Foucault method. The detector grating is divided into two sub-gratings 15a and 15b, which sub-gratings deflect the beam portions incident thereon at different angles. A possible grating structure of the detector grating is shown in FIG. 5b. This Figure only shows a few grating lines for the sake of clarity. The grating lines in the two grating parts have a different orientation because the lines in the two parts do not have the same centre. The detection system 17 of FIG. 5a comprises four juxtaposed detection elements 23a, 23b, 23c, 23d. The beam deflected by the sub-grating 15a forms a spot 24a on the detection elements 23a and 23b, while the beam deflected by the sub-grating 15b forms a spot 24b on the detection elements 23c and 23d. When the scanning focus 13 is located exactly on the recording surface 2, the spots 24a and 24b are located on the bounding line 25a between the detection elements 23a and 23b and on the bounding line 25b between the detection elements 23c and 23d, respectively. When the focus is located above or below the recording surface, the spots 24a and 24b move away from each other or move towards each other, respectively. A focus error signal can be obtained by adding and subtracting the signals of the detection elements in the correct combinations and in known manner.

Figure 6A:
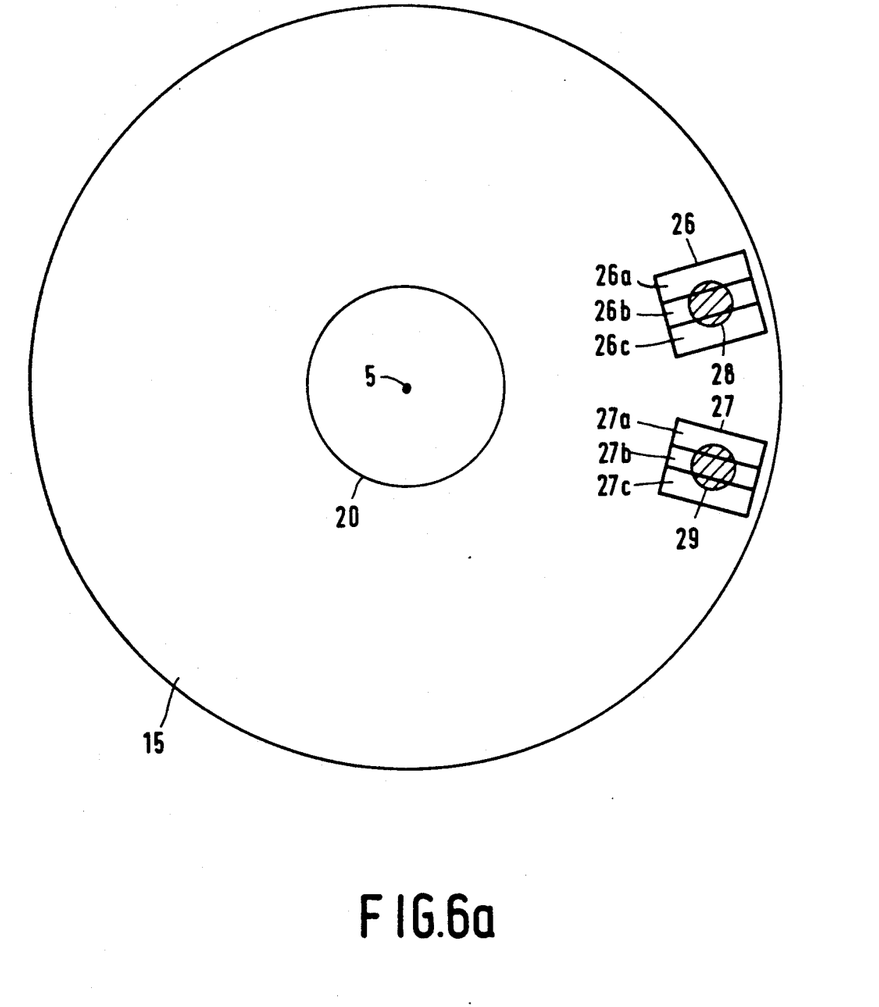
FIG. 6a is a plan view of the detector grating and the detection system for generating the focus error in accordance with the beam size method.
Figure 6B:
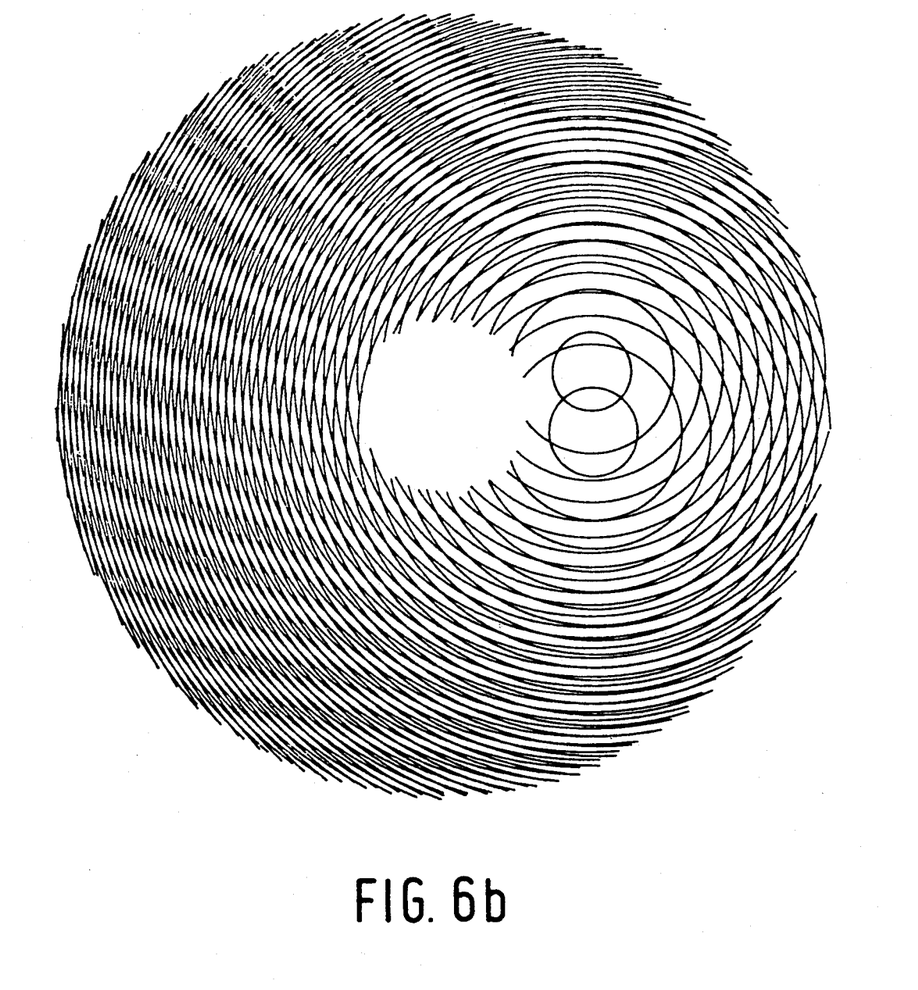
FIG. 6b shows an embodiment of a detector grating for generating this focus error.

The beam size method is known per se from U.S. Pat. No. 4,724,533. FIG. 6 shows diagrammatically an embodiment of a scanning head according to the invention in which this method is used. The detector grating has two interlaced circular patterns of grating lines as is shown, for example, in FIG. 6b. For the sake of clarity this Figure shows only a few grating lines. The grating lines of the two patterns have a different orientation and grating period so that two beams are formed which are directed on two detection system 26 and 27 on which they form spots 28 and 29, respectively. One of the beams is focused above the plane of the detection systems and the other is focused below it. When the focus of the scanning beam 11 is located exactly on the information plane, the spots 26 and 27 are equally large. When the focus is below or above the recording surface, the dimension of one of the spots 28 and 29 increases and the dimension of the other spot decreases. The detection system 26 and 27 comprise three detection elements each, 26a, 26b, 26c and 27a, 27b, 27c, respectively. The difference in size of the spots 28 and 29 can be determined by adding and subtracting the signals of the detection elements in the correct combinations, which difference is a measure of the focus error.

The detection systems of FIGS. 4, 5 and 6 can also be used for generating a tracking error signal and a signal representing the information which has been read. The last signal, the information signal can be obtained by adding the signals of all detection elements. The tracking error signal is obtained, for example, by taking the difference of the sum signal of the detection elements 21a and 21b in FIG. 4 (23a and 23b in FIG. 5) and the sum signal of the detection elements 21c and 21d in FIG. 4 (23c and 23d in FIG. 5).

Figure 7:
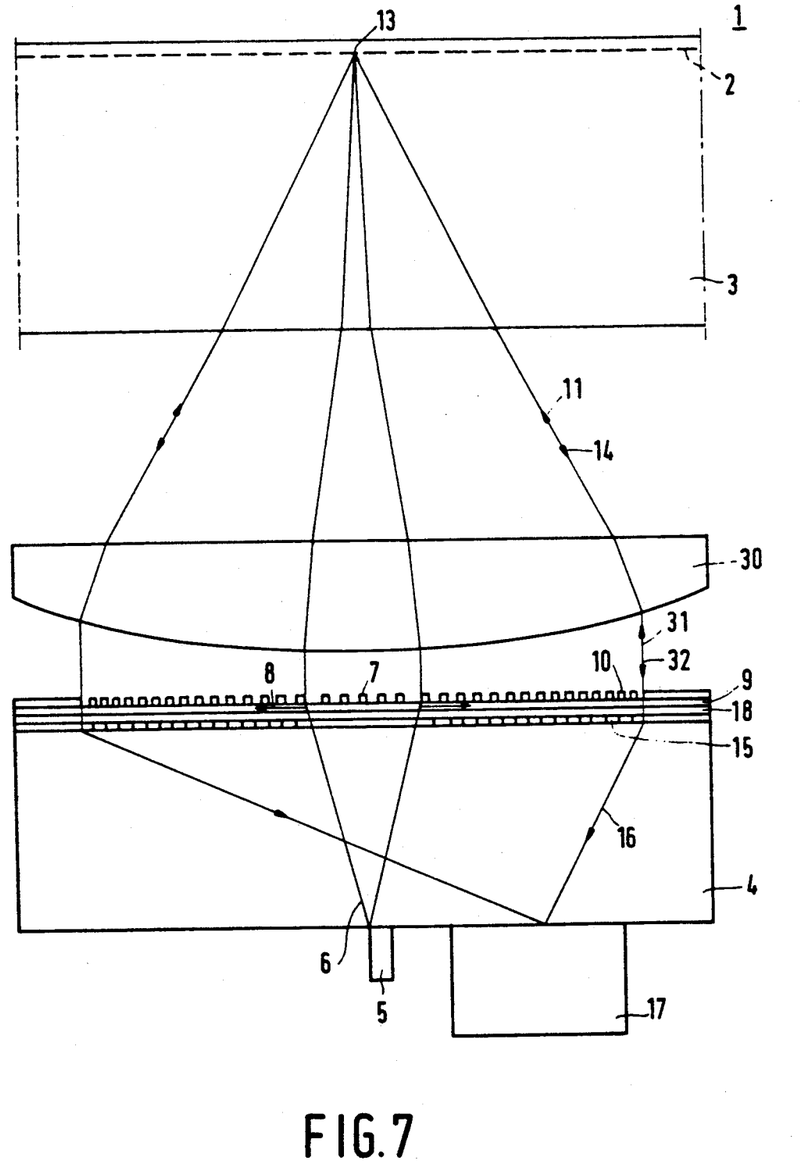
FIG. 7 shows an optical head provided with a lens.

The output grating 10 and the detection grating 15 must deflect the radiation through a large angle in the optical heads shown in FIGS. 1, 2 and 3. Strict tolerance requirements must then be imposed on these gratings. By providing a lens 30, as in FIG. 7, which takes care of at least a part of the deflection, the gratings need only deflect through small angles so that the tolerance requirements for these gratings can be alleviated. The output grating 10 of FIG. 7 is only to form a beam 31 going straight up from the radiation 8 in the waveguide 9, instead of a converging beam 11 as is shown, for example, in FIG. 1. It is even possible for the beam 31 to be a diverging beam so as to even further alleviate the requirements imposed on the output grating. The lens 30 transforms the beam 31 to a converging scanning beam 11 which is incident on the record carrier 1 with the desired numerical aperture. After reflection on the reflection on the recording surface 2, the lens 30 forms a beam 32 which, after transmission by the output grating 10, is deflected as detector beam 16 towards the detection system 17 by the detector grating 15. The change of direction between the beams 32 and 16 is smaller than between the beams 14 and 16 in FIG. 1 in which no use is made of a lens. Consequently, the tolerance requirements for the detector grating 15 of FIG. 7 are not as strict as those for the same grating of FIG. 1. The lens 30 may be a spherical lens in which the necessary corrections, for example, the spherical aberration correction for the scanning beam 11 are built in the output grating 10. It is alternatively possible for the lens 30 to be a monoaspherical or biaspherical lens so that corrections can be performed by the lens itself. The lens 30 may be used in any optical head with an output grating 10, independent of the fact whether it comprises a detector grating 15.

As is known, the operation of a grating is dependent on the wavelength of the beam which must be influenced by this grating. For example, only a narrow wavelength band around the wavelength for which the grating is designed is coupled out of the radiation beam 6 into the waveguide 9 by the input grating 7. Some diode lasers generate multi-mode radiation, in which mode the radiation is emitted at a number of proximate wavelengths. Consequently, a part of such a multi-mode radiation is not used because it is not coupled in by the input grating. A further problem is that particularly in the case of a diode laser a temperature variation of or the electric current through this laser may change the wavelength. A small change of the wavelength may already cause the quantity of radiation 8 coupled out of the diode laser 5 into the waveguide to decrease drastically. It could be considered to stabilize the wavelength of the laser by controlling the current and the temperature of the diode laser. A temperature control for a laser diode considerably complicates the construction of the optical head. According to the invention said problems can be mitigated by rendering the optical path of the radiation source 5 via the recording surface 2 towards the detection system 17 suitable for different wavelengths. This can be realised by dividing the input grating 7, the output grating 10 and the detector grating 15 into groups of sectors in which the sectors of each group are optimized for specific wavelengths.

Figure 8:
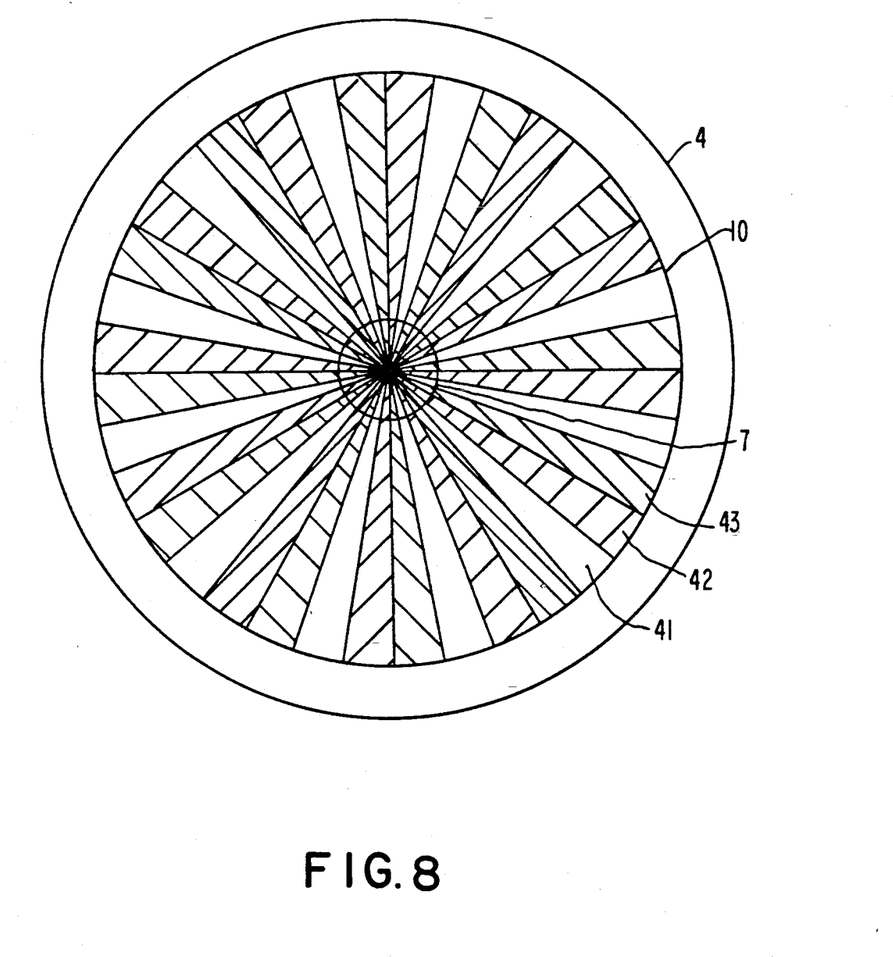
FIG. 8 shows a grating divided into sectors.

A possible embodiment of an input grating and an output grating divided into sectors is shown in FIG. 8. This Figure shows the input grating 7 and the output grating 10 on the substrate 4. In this embodiment each grating is divided into three groups of twelve sectors each. The group of blank first sectors 41 is optimized to focus radiation of a first wavelength from the radiation source 5 on the recording surface 2 via successively the input grating 7 and the output grating 10 and subsequently to guide this radiation towards the detection system 17 via the detector grating 15. Since diametrically opposite sectors in each grating have the same grating structure and since the associated sectors in the different gratings are superposed, an optical path of the radiation source 5 is formed for the associated wavelength via the input and output gratings 7, 10 towards the recording surface 2 and subsequently via the detector grating 15 towards the detection system 17. Analogously, a light path which is optimized for a second and a third wavelength is formed by means of the hatched second and third sectors, 42 and 43 respectively. Radiation of the first wavelength does not reach the second and third sectors of the output grating 10, because the input grating 7 in these sectors of the pupil does not have a correct grating structure to couple the first wavelength out of the radiation source 5 into the waveguide 9. Consequently, each light path uses a third part of the surface of the pupil. The number of sectors in grating for one wavelength must be determined with reference to the desired quality of the scanning focus 13. The spectral width of the radiation from the radiation source, the variation of the central wavelength and the wavelength-dependent behaviour of the gratings in the sectors determine the number of different wavelengths for which the gratings must be designed. The embodiment of FIG. 8 is optimized for three wavelengths. It will be evident that the division of the gratings into sectors is also possible in optical heads which do not comprise a detector grating but only an input grating and an output grating.

The invention has been described with reference to an optical head for scanning a recording surface in an optical record carrier. It will be evident that the invention can also be used for writing information into recording layers. The optical head according to the invention can also be used in apparatuses for inspecting surfaces in which contours in a surface are scanned. An example of such an apparatus is a scanning microscope.

I claim:

1. An optical head for scanning a surface, which head is provided with a radiation source, an element comprising a substrate on which an input grating is arranged for coupling the radiation from the source into a waveguide of the element, an output grating arranged on the substrate around the input grating for coupling radiation out of the waveguide and for directing said radiation in the form of a scanning beam onto the surface, and a detection system, characterized in that the optical head is provided with a detector grating arranged around the input grating for deflecting the radiation reflected by the record carrier towards the detection system.

2. An optical head as claimed in claim 1, in which the output grating is arranged at that side of the substrate which is remote from the radiation source, characterized in that the detector grating is arranged at that side of the substrate which faces the radiation source.

3. An optical head as claimed in claim 1, characterized in that the radiation source is secured to the substrate.

4. An optical head as claimed in claim 1, characterized in that the detection system is secured to the substrate.

5. An optical head as claimed in claim 1, characterized in that the substrate comprises two interconnected parts, in that the detector grating is located between the two substrate parts and in that the output grating is located at the side, remote from the radiation source, of that substrate part which is furthest remote from the radiation source.

6. An optical head as claimed in claim 1, characterized in that the detector grating introduces astigmatism into a deflected beam and in that the detection system comprises a four-quadrant detector for generating a focus error signal.

7. An optical head as claimed in claim 1, characterized in that the detector grating comprises two grating parts for forming two deflected beams which are focused at the same distance from the detector grating, one of the grating parameters, grating period and orientation of the grating lines, being different for the two grating parts, and in that the detection system for each one of said beams comprises two detectors for generating a focus error signal.

8. An optical head as claimed in claim 1, characterized in that the detector grating comprises two interlaced patterns of grating lines for forming two deflected beams which are focused at mutually different distances from the detector grating, and for each of said beams is provided with a detection system for determining the diameter of the beam at the location of the detection system.

9. An optical head as claimed in claim 1, characterized in that a lens is arranged in the optical path of the scanning beam.

10. An optical head as claimed in claim 1, characterized in that the detector grating, the output grating and the input grating are each divided into n groups of m identical sectors which are associated with each other and are located symmetrically with respect to each other, in which the corresponding groups of sectors of the three gratings form part of a radiation path for a beam having a given wavelength of the radiation source, and in which n and m are integers which are larger than one.

11. An optical head as claimed in claim 2, characterized in that the radiation source is secured to the substrate.

12. An optical head as claimed in claim 3, characterized in that the detection system is secured to the substrate.

13. An optical head as claimed in claim 12, characterized in that the substrate comprises two interconnected parts, in that the detector grating is located between the two substrate parts and in that the output grating is located at the side, remote from the radiation source, of that substrate part which is furthest remote from the radiation source.

14. An optical head as claimed in claim 11, characterized in that the substrate comprises two interconnected parts, in that the detector grating is located between the two substrate parts and in that the output grating is located at the side, remote from the radiation source, of that substrate part which is furthest remote from the radiation source.

15. An optical head as claimed in claim 14, characterized in that the detector grating introduces astigmatism into a deflected beam and in that the detection system comprises a four-quadrant detector for generating a focus error signal.

16. An optical head as claimed in claim 12, characterized in that the detector grating comprises two grating parts for forming two deflected beams which are focused at the same distance from the detector grating, one of the grating parameters, grating period and orientation of the grating lines, being different for the two grating parts, and in that the detection system for each one of said beams comprises two detectors for generating a focus error signal.

17. An optical head as claimed in claim 14, characterized in that the detector grating comprises two interlaced patterns of grating lines for forming two deflected beams which are focused at mutually different distances from the detector grating, and for each of said beams is provided with a detection system for determining the diameter of the beam at the location of the detection system.

18. An optical head as claimed in claim 12, characterized in that the detector grating comprises two interlaced patterns of grating lines for forming two deflected beams which are focused at mutually different distances from the detector grating, and for each of said beams is provided with a detection system for determining the diameter of the beam at the location of the detection system.

19. An optical head as claimed in claim 8, characterized in that the detector grating, the output grating and the input grating are each divided into n groups of m identical sectors which are associated with each other and are located symmetrically with respect to each other, in which the corresponding groups of sectors of the three gratings form part of a radiation path for a beam having a given wavelength of the radiation source, and in which n and m are integers which are larger than one.

20. An optical head as claimed in claim 5, characterized in that the detector grating, the output grating and the input grating are each divided into n groups of m identical sectors which are associated with each other and are located symmetrically with respect to each other, in which the corresponding groups of sectors of the three gratings form part of a radiation path for a beam having a given wavelength of the radiation source, and in which n and m are integers which are larger than one.

* * * * *